US012759244B2

(12) United States Patent
Takahashi et al.

(10) Patent No.: US 12,759,244 B2
(45) Date of Patent: *Oct. 13, 2026

(54) METHOD FOR MANUFACTURING JOINED BODY

(71) Applicant: Resonac Corporation, Tokyo (JP)

(72) Inventors: Nobuyuki Takahashi, Tokyo (JP); Masatoshi Mori, Tokyo (JP)

(73) Assignee: Resonac Corporation, Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 18/578,636

(22) PCT Filed: Dec. 21, 2022

(86) PCT No.: PCT/JP2022/047241
§ 371 (c)(1),
(2) Date: Jan. 11, 2024

(87) PCT Pub. No.: WO2023/127667
PCT Pub. Date: Jul. 6, 2023

(65) Prior Publication Data

US 2024/0308148 A1 Sep. 19, 2024

(30) Foreign Application Priority Data

Dec. 27, 2021 (JP) ................................ 2021-213476

(51) Int. Cl.
*B29C 65/44* (2006.01)
*B29C 65/34* (2006.01)

(52) U.S. Cl.
CPC .......... *B29C 65/44* (2013.01); *B29C 65/3456* (2013.01); *B29C 65/3468* (2013.01)

(58) Field of Classification Search
CPC ......... B29C 65/04; B29C 65/06; B29C 65/08; B29C 65/10; B29C 65/18; B29C 65/20;
(Continued)

(56) References Cited

U.S. PATENT DOCUMENTS

2003/0107145 A1 6/2003 Ozasa et al.
2006/0147720 A1 7/2006 Moore
(Continued)

FOREIGN PATENT DOCUMENTS

CN 101579924 A 11/2009
CN 104246914 A 12/2014
(Continued)

OTHER PUBLICATIONS

Communication dated Dec. 11, 2025 issued by the United States Patent and Trademark Office in U.S. Appl. No. 18/723,979.
(Continued)

*Primary Examiner* — Jennifer A Boyd
(74) *Attorney, Agent, or Firm* — Sughrue Mion, PLLC

(57) ABSTRACT

Provided is a method for producing a joined body obtained by joining a base material A, a film containing an amorphous thermoplastic resin, which is at least one of a thermoplastic epoxy resin and a phenoxy resin, as a main component, and a resin B in this order. The method includes a first joining step of joining the base material A and the film by melting and then solidifying the film in a state in which the film is in contact with the base material A, and a second joining step of joining the base material A and the resin B by melting and then solidifying the film in a state in which the film joined to the base material A is in contact with the resin B. The base material A is at least one of a metal and an inorganic substance, an epoxy equivalent of the amorphous thermoplastic resin is 1,600 g/eq. or more, or the amorphous thermoplastic resin does not contain an epoxy group, and a heat of fusion of the amorphous thermoplastic resin is 15 J/g or less.

7 Claims, 1 Drawing Sheet

(58) Field of Classification Search

CPC . B29C 65/3456; B29C 65/3468; B29C 65/44; B29C 65/46; B29C 65/4815; B29C 65/4835; B29C 65/5057; B29C 65/8215; B29C 65/8223; B29C 66/02245; B29C 66/0242; B29C 66/026; B29C 66/028; B29C 66/1122; B29C 66/30223; B29C 66/43; B29C 66/45; B29C 66/71; B29C 66/721; B29C 66/7212; B29C 66/72321; B29C 66/73115; B29C 66/7392; B29C 66/7394; B29C 66/742; B29C 66/7422; B29C 66/7428; B29C 66/74281; B29C 66/74288; B29C 66/7444; B29C 66/7461; B29C 66/74611; B29C 66/7465; B29C 66/91414; B29C 66/919; B29C 66/929; B29C 66/949; B29C 66/9513; B32B 15/08; B32B 15/092; B32B 15/20; B32B 2307/30; B32B 2307/702; B32B 27/08; B32B 27/38; B32B 7/12; B32B 9/045; C08G 2650/56; C08G 59/066; C09J 163/00; C09J 171/02; C09J 171/12; C09J 2400/163; C09J 2400/226; C09J 2463/00; C09J 5/06; C09J 7/35

USPC .. 156/60, 272.2, 275.7, 308.2, 309.6, 309.9, 156/325, 326, 327, 330

See application file for complete search history.

(56) References Cited

U.S. PATENT DOCUMENTS

| | | | | |
|---|---|---|---|---|
| 2008/0156437 | A1* | 7/2008 | Kawate | H05K 3/361 156/330 |
| 2009/0036631 | A1 | 2/2009 | Kaji et al. | |
| 2009/0286035 | A1 | 11/2009 | Matsuo et al. | |
| 2012/0048598 | A1 | 3/2012 | Kaimori et al. | |
| 2013/0309465 | A1* | 11/2013 | Oda | B29C 65/5057 428/212 |
| 2015/0096663 | A1* | 4/2015 | Siboni | C09J 163/00 156/330 |
| 2018/0050736 | A1 | 2/2018 | Teshima | |
| 2018/0201218 | A1 | 7/2018 | Zhang et al. | |
| 2019/0077089 | A1 | 3/2019 | Nishiguchi et al. | |
| 2020/0130320 | A1 | 4/2020 | Sei | |
| 2021/0129488 | A1* | 5/2021 | Takahashi | B32B 27/281 |
| 2021/0268976 | A1 | 9/2021 | Gibeau et al. | |
| 2024/0300213 | A1 | 9/2024 | Takahashi et al. | |
| 2025/0006557 | A1 | 1/2025 | Huang et al. | |
| 2025/0065549 | A1 | 2/2025 | Takahashi et al. | |
| 2025/0065574 | A1 | 2/2025 | Takahashi et al. | |
| 2025/0091297 | A1 | 3/2025 | Takahashi et al. | |
| 2025/0353286 | A1 | 11/2025 | Takahashi et al. | |
| 2025/0367886 | A1 | 12/2025 | Takahashi et al. | |

FOREIGN PATENT DOCUMENTS

| | | | |
|---|---|---|---|
| CN | 109070488 | A | 12/2018 |
| CN | 112694599 | A | 4/2021 |
| DE | 102016212622 | A1 | 1/2018 |
| EP | 4242070 | A1 | 9/2023 |
| EP | 4 372 062 | A1 | 5/2024 |
| JP | 48-21724 | A | 3/1973 |
| JP | 55-12147 | A | 1/1980 |
| JP | 56-53072 | A | 5/1981 |
| JP | 56-89520 | A | 7/1981 |
| JP | S56106983 | A | 8/1981 |
| JP | 63-312818 | A | 12/1988 |
| JP | 2-115535 | U | 9/1990 |
| JP | 6-234183 | A | 8/1994 |
| JP | 8-508951 | A | 9/1996 |
| JP | 9-92040 | A | 4/1997 |
| JP | 10-17685 | A | 1/1998 |
| JP | 10-71685 | A | 3/1998 |
| JP | 10-157896 | A | 6/1998 |
| JP | 10-168417 | A | 6/1998 |
| JP | 10-251613 | A | 9/1998 |
| JP | 11-181349 | A | 7/1999 |
| JP | 2001-19743 | A | 1/2001 |
| JP | 2001-354936 | A | 12/2001 |
| JP | 2003-129611 | A | 5/2003 |
| JP | 2008-296556 | A | 12/2008 |
| JP | 2009-298136 | A | 12/2009 |
| JP | 2011-126942 | A | 6/2011 |
| JP | 2012-61511 | A | 3/2012 |
| JP | 2012-94312 | A | 5/2012 |
| JP | 2015533191 | A | 11/2015 |
| JP | 2016-33391 | A | 3/2016 |
| JP | 2016-78283 | A | 5/2016 |
| JP | 2017-52907 | A | 3/2017 |
| JP | 2017-177465 | A | 10/2017 |
| JP | 2018-20747 | A | 2/2018 |
| JP | 2018-30542 | A | 3/2018 |
| JP | 2019-157018 | A | 9/2019 |
| JP | 2019-209767 | A | 12/2019 |
| JP | 2020-19307 | A | 2/2020 |
| JP | 2020-70367 | A | 5/2020 |
| JP | 2021-66805 | A | 4/2021 |
| JP | 2021-535868 | A | 12/2021 |
| JP | 2022-094785 | A | 6/2022 |
| JP | 2022-095441 | A | 6/2022 |
| JP | 2022-096454 | A | 6/2022 |
| JP | 2022-140091 | A | 9/2022 |
| JP | 2022-178565 | A | 12/2022 |
| WO | 2011/016408 | A1 | 2/2011 |
| WO | 2018/124215 | A1 | 7/2018 |
| WO | 2022/014503 | A1 | 1/2022 |
| WO | 2022/118826 | A1 | 6/2022 |
| WO | 2022/172863 | A1 | 8/2022 |
| WO | 2022/209116 | A1 | 10/2022 |

OTHER PUBLICATIONS

Non Final Office Action issued Feb. 23, 2026, in U.S. Appl. No. 18/573,782.

* cited by examiner

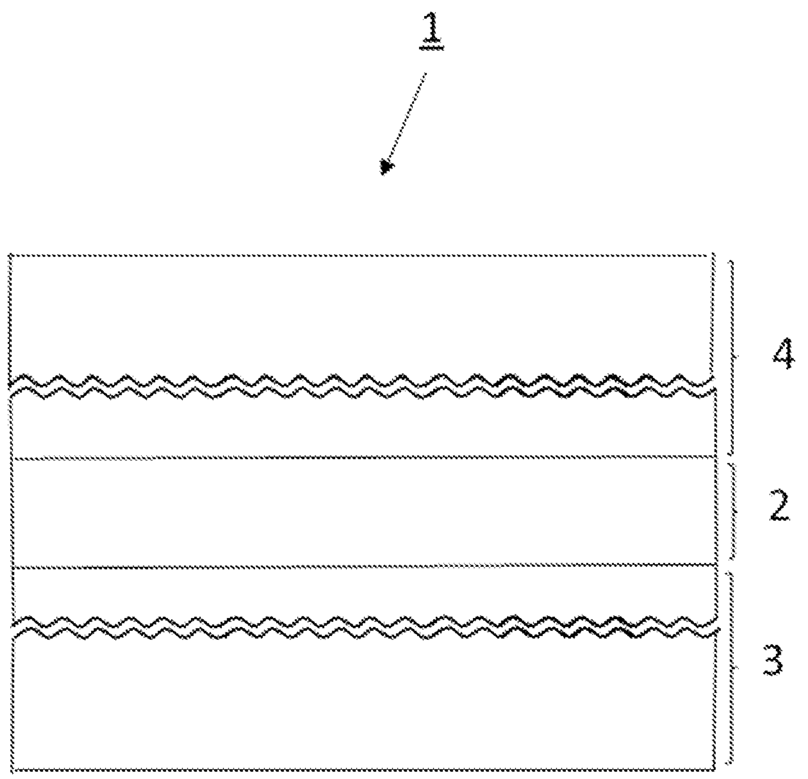
1
4
2
3

METHOD FOR MANUFACTURING JOINED BODY

Cross Reference To Related Applications

This application is a National Stage of International Application No. PCT/JP2022/047241 filed Dec. 21, 2022, claiming priority based on Japanese Patent Application No. 2021-213476 filed Dec. 27, 2021.

TECHNICAL FIELD

The present invention relates to a method for producing a joined body which is suitable for applications in which different kinds of materials are easily and firmly joined.

BACKGROUND ART

In recent years, multi-materialization of parts in various fields, such as automobile parts, medical equipment, and home appliances, has been progressing from the viewpoint of weight reduction and high capability of products. The multi-materialization is a method of reducing the weight of a material and increasing the strength of the material by using materials (hereinafter, referred to as different kinds of materials) having different functions and materials in combination. In order to realize the multi-materialization, a technique for firmly joining the different kinds of materials is indispensable.

As a means for firmly joining the different kinds of materials, a thermosetting epoxy resin-based adhesive (PTL 1 and the like) which is a liquid type adhesive is widely used.

Joining using a liquid type adhesive requires an application step of applying a liquid resin composition and a curing step of polymerizing and curing the resin composition after the application.

Therefore, when the joining is performed using the liquid type adhesive, there is a problem that it takes a long time to coat the resin composition in the coating step, and it takes a long time for the polymerization reaction in the curing step (that is, the joining process takes a long time), resulting in a lack of convenience.

In the description herein, the joining process time means a time from a start point to an end point with a contact time between at least one of base materials and a film constituting a joined body as the start point and a completion time of the production of the joined body as the end point. For example, the joining process time corresponds to a time required for a step of placing the film on the base material and a time required for joining the base materials (for example, curing the film).

A technique has also been disclosed in which a thermosetting epoxy resin composition is impregnated or coated on a base material and then semi-cured (B-staged) to form a laminated body having an adhesive layer made of a B-staged thermosetting epoxy resin-based adhesive, which is used for producing a joined body (PTL 2 and the like).

However, also in the case of using a laminated body having a B-stage-shaped adhesive layer, a curing step of curing the B-stage-shaped adhesive layer by polymerization reaction is required, and there is a problem that the joining process time is long.

In addition, the B-stage-shaped adhesive layer has problems that the storage stability is poor, the long-term storage at ordinary temperature is not possible, the storage at a low temperature is required, the open time is short, and the convenience is lacking.

In the description herein, the open time means a limited time from when a joining agent or an adhesive is applied or placed on a base material A to when a base material B is completely placed on the base material A. Within the open time, the bonding force of the joining agent or the adhesive is not reduced, and the base material A and the base material B can be bonded to each other with a sufficient bonding force. The longer the open time is, the longer the time limit from the application or placement of the joining agent or the adhesive on the base material A to the completion of the placement of the base material B becomes, which is highly convenient.

As a means for joining different kinds of materials, a hot-melt adhesive which is a thermoplastic adhesive is also used (PTL 3 and the like). The hot-melt adhesive is solid at ordinary temperature, and is liquefied by being heated and melted. The liquefied hot-melt adhesive is applied to an adherend, and joining is formed by cooling and solidification. Since the hot-melt adhesive performs adhesion by utilizing a phase change that does not involve a polymerization reaction, an application step is unnecessary, the curing time is short (that is, the joining process time is short), and the convenience is excellent. Further, the hot-melt adhesive can be stored at ordinary temperature for a long period of time, and is excellent in convenience in that the open time is long.

However, since the conventional hot-melt adhesive is composed of a crystalline resin or a resin containing a crystalline resin in order to lower the melt viscosity, the cohesive force in the adhesive resin is high, and the hot-melt adhesive cannot have a sufficient interaction with the base material. In addition, during melting and adhesion, the viscosity becomes low at high temperatures, and it is easy to flow out from the bonding surface, and the film thickness is not stable because it is difficult to control the viscosity. Due to these factors, there is a problem that a high bonding force cannot be stably obtained with a conventional hot-melt adhesive.

CITATION LIST

Patent Literature

PTL 1: JP 2019-157018 A
PTL 2: JP 10-17685 A
PTL 3: JP 10-168417 A

SUMMARY OF INVENTION

Technical Problem

The present invention has been made in view of such technical background, and it is an object of the present invention to provide a method for producing a joined body, which can produce a joined body having a short joining process time, a long open time, and excellent joining property.

Solution to Problem

As a result of extensive studies, the present inventors have found that the above problem can be solved by having a first joining step of joining a base material A and a film by melting and then solidifying the film in a state in which a predetermined film is in contact with the base material A, and a second joining step of joining the base material A and a resin B by melting and then solidifying the film in a state in which the film joined to the base material A is in contact with the resin B. The present invention is based on this finding.

That is, the present invention provides the following [1] to [7].

[1] A method for producing a joined body obtained by joining a base material A, a film containing an amorphous thermoplastic resin, which is at least one of a thermoplastic epoxy resin and a phenoxy resin, as a main component, and a resin B in this order, the method including:

a first joining step of joining the base material A and the film by melting and then solidifying the film in a state in which the film is in contact with the base material A; and a second joining step of joining the base material A and the resin B by melting and then solidifying the film in a state in which the film joined to the base material A is in contact with the resin B, in which the base material A is at least one of a metal and an inorganic substance, an epoxy equivalent of the amorphous thermoplastic resin is 1,600 g/eq. or more, or the amorphous thermoplastic resin does not contain an epoxy group, and a heat of fusion of the amorphous thermoplastic resin is 15 J/g or less.

[2] The method for producing a joined body according to [1] above, in which the resin B is made of a thermoplastic resin.

[3] The method for producing a joined body according to [1] or [2] above, in which the base material A is made of a metal.

[4] The method for producing a joined body according to any one of [1] to [3] above, in which in the first joining step, the film is heated to 100° C. to 300° C. to be melt and then solidified.

[5] The method for producing a joined body according to any one of [1] to [4] above, in which in the second joining step, the film is melted and then solidified by at least one selected from the group consisting of contact heating, warm air heating, hot press, infrared heating, hot plate welding, ultrasonic welding, vibration welding, and high-frequency induction welding.

[6] The method for producing a joined body according to any one of [1] to [5] above, in which in the second joining step, the film is melted and then solidified by heating at a temperature equal to or higher than a melting point of at least one of the resin B or the film.

[7] The method for producing a joined body according to any one of [1] to [6] above, in which in the second joining step, the film is melted and then solidified at a heating temperature of 100° C. to 400° C. under a pressure of 0.01 to 20 MPa.

Advantageous Effects of Invention

According to the present invention, it is possible to provide a method for producing a joined body capable of producing a joined body having a short joining process time, a long open time, and excellent joining property.

BRIEF DESCRIPTION OF DRAWINGS

The Figure is an illustrative view illustrating a configuration of a joined body in one embodiment of the present invention.

DESCRIPTION OF EMBODIMENTS

Hereinafter, embodiments of the present invention will be described in detail.

In the description herein, the term “joining” means coupling materials together, and adhesion (bonding) and welding are narrower concepts thereof. The term “adhesion” means that two adherends (to be adhered to each other) are placed in a joined state through an organic material (such as thermosetting resins or thermoplastic resins) such as a tape or an adhesive. The term “welding” means bringing the surfaces of thermoplastic resins and the like into a joined state by utilizing entanglement and crystallization due to molecular diffusion, which occur in the process of melting the surfaces by heat and cooling the surfaces.

In the description herein, the description of “A to B” indicating a numerical range indicates a numerical range including A and B which are endpoints. That is, it means “A or more and B or less” (when A<B), or “A or less and B or more” (when A>B).

[Production Method of Joined Body]

The method for producing a joined body according to the present embodiment is a method for producing a joined body obtained by joining a base material A, a film containing an amorphous thermoplastic resin, which is at least one of a thermoplastic epoxy resin and a phenoxy resin, as a main component, and a resin B in this order, the method including: a first joining step of joining the base material A and the film by melting and then solidifying the film in a state in which the film is in contact with the base material A; and a second joining step of joining the base material A and the resin B by melting and then solidifying the film in a state in which the film joined to the base material A is in contact with the resin B. The base material A is at least one of a metal and an inorganic substance, an epoxy equivalent of the amorphous thermoplastic resin is 1,600 g/eq. or more, or the amorphous thermoplastic resin does not contain an epoxy group, and a heat of fusion of the amorphous thermoplastic resin is 15 J/g or less.

The term “main component” means a component having the highest content among the resin components in film. The film preferably contains 50% by mass or more of the resin component, more preferably 70% by mass or more, still more preferably 80% by mass or more, and particularly preferably 90% by mass or more.

According to the production method, the joining of the base material A and the resin B utilizes a phase change (solid to liquid to solid) of a film containing an amorphous thermoplastic resin, which is at least one of a thermoplastic epoxy resin and a phenoxy resin, as a main component, and does not involve a chemical reaction, so that the joining can be completed in a shorter time than that of a conventional thermosetting epoxy resin, and the open time is also longer.

In addition, since the predetermined thermoplastic epoxy resin and the phenoxy resin, which are the main components of the film, have a low cohesive force in the resins and have a hydroxy group, they interact strongly with the base material, and can join different kinds of materials with a higher joining force than conventional crystalline hot-melt adhesives.

In addition, in the production method, the joining is performed by dividing the steps into a first joining step and a second joining step. By dividing the steps in this way, joining can be performed by heating at a temperature suitable for the joining interface, and a joined body having excellent joining property can be produced. In addition, the heating temperature control becomes easier than in the case where the steps are not divided, and deformation of the resin B due to heating can also be suppressed. Further, by joining the film to the base material A in advance, it is possible to accurately join the base material A and the resin B, and it is possible to suppress the occurrence of deviation at the joined portion.

First Joining Step

The first joining step is a step of joining the base material A and the film by melting and then solidifying the film in a state in which the film is brought into surface contact with the base material A.

By joining the base material A and the film in advance in the first joining step, it is possible to join the base material A and the resin B with high accuracy.

In the description herein, the term "solidified" means that the material is solid at ordinary temperature, that is, the material does not have fluidity in a non-pressurized state at 23° C. However, the film after the first joining step may have tackiness.

Examples of the method for melting the film include at least one method selected from the group consisting of contact heating, warm air heating, hot press, hot plate welding, infrared heating, ultrasonic welding, vibration welding, and high-frequency induction welding. Among these, infrared heating is preferable from the viewpoint of ease of production and shortening of the joining process.

In a case where the film is melted by heating, the temperature of the joining surface of the base material A with the film is preferably heated to 100° C. to 300° C. and melted, more preferably 120° C. to 250° C., and still more preferably 150° C. to 220° C. By heating to 100° C. to 300° C., the film is efficiently deformed and melted and effectively wets and spreads on the joining surface, whereby a high joining force is obtained.

Examples of the method for solidifying the molten film include a method in which the film is allowed to cool at ordinary temperature and a method in which the film is allowed to cool using a cooling device. The term "ordinary temperature" means a general room temperature in the range of 5° C. to 30° C. Among these, a method in which the film is allowed to cool at ordinary temperature is preferable from the viewpoint of ease of production.

(Film)

The film contains, as a main component, an amorphous thermoplastic resin which is at least one of a thermoplastic epoxy resin and a phenoxy resin. The epoxy equivalent of the amorphous thermoplastic resin is 1,600 g/eq. or more, or the amorphous thermoplastic resin does not contain an epoxy group, and the heat of fusion of the amorphous thermoplastic resin is 15 J/g or less.

In the description herein, the term "film" means a sheet-shaped material having a thickness of 10 μm to 3 mm.

The amorphous thermoplastic resin in the present embodiment means a resin having a heat of fusion of 15 J/g or less in measurement using a differential scanning calorimeter (DSC). However, this includes a case where the endothermic peak due to melting is equal to or less than the detection limit or equal to or less than noise and cannot be differentiated.

The heat of fusion is calculated from the area of the endothermic peak of DSC (Differential Scanning Calorimeter) and the weight of the thermoplastic resin component. When an inorganic filler or the like is contained in the film, the heat of fusion is calculated from the weight of the thermoplastic resin component excluding the inorganic filler. To be specific, 2 to 10 mg of a sample is weighed, placed in an aluminum pan, and heated from 23° C. to 200° C. or higher at 10° C./min using a DSC (DSC8231, manufactured by Rigaku Corporation) to obtain a DSC curve, and then calculated from the area of the endothermic peak at the time of melting obtained from the DSC curve and the aforementioned weighed value.

From the viewpoint of sufficiently imparting the characteristics of the amorphous thermoplastic resin to the film, the content of the amorphous thermoplastic resin is preferably 60% by mass or more, more preferably 70% by mass or more, still more preferably 80% by mass or more, and most preferably 90% by mass or more of the resin components in the film.

The heat of fusion of the amorphous thermoplastic resin is 15 J/g or less, preferably 11 J/g or less, more preferably 7 J/g or less, and still more preferably 4 J/g or less, and the endothermic peak is most preferably equal to or less than the detection limit.

The epoxy equivalent of the amorphous thermoplastic resin is 1,600 g/eq. or more, preferably 2,000 g/eq. or more, more preferably 5,000 g/eq. or more, and still more preferably 9,000 g/eq. or more, and it is most preferable that the epoxy equivalent is above the detection limit and the epoxy group is not substantially detected. The expression "the epoxy equivalent is above the detection limit" means that the epoxy group is not detected when the epoxy equivalent is measured based on JIS K 7236:2001 described later.

By using a film containing an amorphous thermoplastic resin, which is at least one of a thermoplastic epoxy resin and a phenoxy resin, as a main component, in which the amorphous thermoplastic resin has an epoxy equivalent of 1,600 g/eq. or more, or the amorphous thermoplastic resin does not contain an epoxy group, and the amorphous thermoplastic resin has a heat of fusion of 15 J/g or less, a rapid decrease in viscosity during heating as seen in a conventional hot-melt adhesive does not occur, and a state of low viscosity (0.001 to 100 Pa·s) is not achieved even in a high-temperature region exceeding 200° C. Therefore, the film does not flow out from a laminated body even in a molten state, and the thickness of the joining layer formed by melting and then solidifying the film can be stably ensured, and a high joining force can be stably obtained.

The epoxy equivalent (the weight of the thermoplastic resin containing 1 mol of epoxy group) referred to herein is a value of the epoxy equivalent of the thermoplastic epoxy resin or phenoxy resin contained in the film before joining, and is a value (unit "g/eq.") measured by a method specified in JIS K 7236:2001. Specifically, a brominated tetraethylammonium acetic acid solution is added using a potentiometric titrator, a 0.1 mol/L perchloric acid-acetic acid solution is used, and a numerical value as a solid content conversion value from non-volatile matter is calculated for a solvent diluted product (resin varnish). In the case of a mixture of two or more kinds of resins, it is also possible to calculate from the content of each resin and the epoxy equivalent.

In a case where the amorphous thermoplastic resin as the main component of the film has a melting point, the melting point is preferably 50° C. to 400° C., more preferably 60° C. to 350° C., and still more preferably 70° C. to 300° C. When the melting point is in the range of 50° C. to 400° C., the film is efficiently deformed and melted by heating and effectively wets and spreads on the joined surface, so that high joining force can be obtained.

In the description herein, the melting point of the thermoplastic resin means an endothermic peak temperature measured by DSC. In the case where an endothermic peak is not obtained or the heat of fusion is 15 J/g or less, a temperature obtained by adding 70° C. to the glass transition point is taken as the melting point. The glass transition point means a temperature at the start of the drop in a DSC curve in a second cycle in which the temperature is raised to 200° C., then cooled to 40° C. or lower, and then heated to 200° C. in DSC. Specifically, the glass transition point is a value measured by the method described in Examples.

The conventional heat-curable adhesive has problems that it is difficult to disassemble the joined body, it is difficult to separate and recycle different kinds of materials constituting the joined body (i.e., poor in recycling property), and it is difficult to reattach the joined body when the joining portion is displaced in the production process of the joined body or when the contents or the adherend has a defect and needs to be replaced (i.e., poor in repairing property), thus lacking convenience. However, the film can be softened and melted by heat and can be easily peeled off, so it has excellent recycling property. In addition, since the film is thermoplastic, it can be reversibly softened, melted, and cured repeatedly, and is also excellent in repairing property.

<<Thermoplastic Epoxy Resin>>

The thermoplastic epoxy resin is preferably a polymer of (a) a bifunctional epoxy resin monomer or oligomer and (b) a bifunctional compound having two identical or different functional groups selected from the group consisting of a phenolic hydroxy group, a carboxy group, a mercapto group, an isocyanate group, and a cyanate ester group.

By using such a compound, the polymerization reaction for forming a linear polymer preferentially proceeds, and a thermoplastic epoxy resin having desired properties can be obtained.

The bifunctional epoxy resin monomer or oligomer (a) refers to an epoxy resin monomer or oligomer having two epoxy groups in the molecules.

Specific examples of (a) include, for example, bisphenol A type epoxy resins, bisphenol F type epoxy resins, difunctional phenol novolac type epoxy resins, bisphenol AD type epoxy resins, biphenyl type epoxy resins, difunctional naphthalene type epoxy resins, difunctional alicyclic epoxy resins, difunctional glycidyl ester type epoxy resins (e.g., diglycidyl phthalate, diglycidyl tetrahydrophthalate, dimer acid diglycidyl ester, etc.), difunctional glycidyl amine type epoxy resins (e.g., diglycidyl aniline, diglycidyl toluidine, etc.), difunctional heterocyclic epoxy resins, difunctional diaryl sulfone type epoxy resins, hydroquinone type epoxy resins (e.g., hydroquinone diglycidyl ether, 2,5-di-tert-butyihydroquinone diglycidyl ether, resorcin diglycidyl ether, etc.), difunctional alkylene glycidyl ether-based compounds (e.g., butanediol diglycidyl ether, butenediol diglycidyl ether, butynediol diglycidyl ether, etc.), difunctional glycidyl group-containing hydantoin compounds (e.g., 1,3-diglycidyl-5,5-dialkylhydantoin, 1-glycidyl-3-(glycidoxyalkyl)-5,5-dialkylhydantoin, etc.), difunctional glycidyl group-containing siloxanes (e.g., 1,3-bis(3-glycidoxypropyl)-1,1,3,3-tetramethyldisiloxane, α,β-bis(3-glycidoxypropyl)polydimethylsiloxane, etc.), and modified products thereof. Among these, a bisphenol A type epoxy resin, a bisphenol F type epoxy resin, and a biphenyl type epoxy resin are preferable from the viewpoint of reactivity and workability.

Examples of the bifunctional compound having a phenolic hydroxy group (b) include mononuclear aromatic dihydroxy compounds having one benzene ring such as catechol, resorcin, and hydroquinone; bisphenols such as bis(4-hydroxyphenyl)propane (bisphenol A), bis(4-hydroxyphenyl) methane (bisphenol F), and bis(4-hydroxyphenyl)ethane (bisphenol AD); compounds having a condensed ring such as dihydroxynaphthalene; bifunctional phenol compounds having an allyl group introduced therein, such as diallylresorcin, diallylbisphenol A, and triallyldihydroxybiphenyl; and dibutylbisphenol A.

Specific examples of the carboxyl group-containing compound (b) include adipic acid, succinic acid, malonic acid, cyclohexanedicarboxylic acid, phthalic acid, isophthalic acid, and terephthalic acid.

Examples of the bifunctional compound having a mercapto group (b) include ethylene glycol bisthioglycolate and ethylene glycol bisthiopropionate.

Specific examples of the bifunctional compound having an isocyanate group (b) include diphenylmethane diisocyanate (MDI), isophorone diisocyanate (IPDI), hexamethylene diisocyanate (HMDI), and tolylene diisocyanate (TDI).

Specific examples of the bifunctional compound having a cyanate ester group (b) include 2,2-bis(4-cyanatophenyl) propane, 1,1-bis(4-cyanatophenyl)ethane, and bis(4-cyanatophenyl)methane.

Among the above (b), a bifunctional compound having a phenolic hydroxy group is preferred from the viewpoint of obtaining a polymer having thermoplasticity, a bifunctional compound having two phenolic hydroxy groups and having a bisphenol structure or a biphenyl structure is preferred from the viewpoint of heat resistance and joining property, and bisphenol A, bisphenol F or bisphenol S is preferred from the viewpoint of heat resistance and cost.

When (a) is a bisphenol A type epoxy resin, a bisphenol F type epoxy resin, a bisphenol S type epoxy resin, or a biphenyl type epoxy resin and (b) is bisphenol A, bisphenol F, or bisphenol S, the polymer obtained by polymerization of (a) and (b) has a structure in which a paraphenylene structure and an ether bond are used as a main skeleton, a main chain formed by connecting them with an alkylene group, and a hydroxy group generated by polyaddition are arranged in a side chain.

The linear structure composed of the paraphenylene skeleton can increase the mechanical strength of the polymer after polymerization, and the arranged hydroxy group in the side chain can improve the adhesion to the base materials. As a result, high joining strength can be realized while maintaining the workability of the thermosetting resin. Further, in the case of a thermoplastic resin, the resin can be recycled and repaired by softening and melting the resin by heat, and the recycling property and the repairing property which are problems in a thermosetting resin can be improved.

<<Phenoxy Resin>>

The phenoxy resin is a polyhydroxy polyether synthesized from bisphenols and epichlorohydrin, and has thermoplasticity. For the production of the phenoxy resin, a method by a direct reaction of a dihydric phenol and epichlorohydrin, and a method by an addition polymerization reaction of a diglycidyl ether of a dihydric phenol and a dihydric phenol are known, and the phenoxy resin used in the present invention may be obtained by any production method. In the case of the direct reaction between a dihydric phenol and epichlorohydrin, examples of the dihydric phenol include phenols such as bisphenol A, bisphenol F, bisphenol S, biphenol, biphenylene diol, and fluorene diphenyl; and aliphatic glycols such as ethylene glycol, propylene glycol, and diethylene glycol. Among them, bisphenol A, bisphenol F, and bisphenol S are preferable from the viewpoints of cost, joining property, viscosity, and heat resistance. One kind thereof may be used singly, or two or more kinds thereof may be used in combination.

The phenoxy resin has a chemical structure similar to that of an epoxy resin and has a structure in which a para-phenylene structure and an ether bond are used as a main skeleton, a main chain connecting them, and a hydroxy group is disposed in a side chain.

<<Physical Properties of Thermoplastic Epoxy Resin and Phenoxy Resin>>

The thermoplastic epoxy resin and phenoxy resin preferably have a weight average molecular weight of 10,000 to 500,000, more preferably 18,000 to 300,000, and still more preferably 20,000 to 200,000, which is a value in terms of polystyrene as measured by gel permeation chromatography (GPC). The weight average molecular weight is calculated from an elution peak position detected by GPC, and is a value of a molecular weight in terms of standard polystyrene. When the weight average molecular weight is in the range of this value, the balance between the thermoplasticity and the heat resistance is good, the joined body is efficiently obtained by melting, and the heat resistance thereof is increased. When the weight average molecular weight is 10,000 or more, the heat resistance is excellent, and when it is 500,000 or less, the viscosity at the time of melting is low, and the joining property is increased.

<<Components Other than Resin Components in Film>>

If necessary, the film may or may not contain fillers or additives as components other than the resin components within a range that does not hinder the object of the present invention.

Examples of the filler include an inorganic filler and an organic filler (resin powder).

Examples of the inorganic filler include spherical fused silica, metal powder of metal such as iron, silica sand, talc, calcium carbonate, mica, acid clay, diatomaceous earth, kaolin, quartz, titanium oxide, silica, phenol resin microballoons, and glass balloons.

In a case where the film contains a filler, the content of the filler in 100% by volume of the total amount of the film is preferably 50% by volume or less, more preferably 30% by volume or less, still more preferably 20% by volume or less, and most preferably 10% by volume or less. The volume of the filler can be obtained by dividing the weight of the filler contained in the film by the true specific gravity of the filler.

The content of the resin component in 100% by volume of the total amount of the film is preferably 10% by volume or more, more preferably 20% by volume or more, still more preferably 30% by volume or more, and even more preferably 50% by volume or more, and in one embodiment, 80% by volume or more, in another embodiment, 90% by volume or more, and in another embodiment, 99% by volume or more.

Examples of the additive include a defoaming agent, a coupling agent such as a silane coupling agent, and a pigment, and one or two or more of these may be contained.

The content of the additives in the film is preferably 10% by mass or less, more preferably 5% by mass or less, and still more preferably 1% by mass or less.

The content of the resin component in the film is preferably 10% by mass or more, more preferably 20% by mass or more, still more preferably 30% by mass or more, and even more preferably 50% by mass or more, and in one embodiment, 80% by mass or more, in another embodiment, 90% by mass or more, and in another embodiment, 99% by mass or more.

<<Form of Film>>

The film is a sheet-shaped material having a thickness of 10 μm to 3 mm.

The thickness of the film is preferably 1 mm or less, more preferably 0.5 mm or less, still more preferably 0.3 mm or less, even more preferably 0.2 mm or less, and most preferably 0.1 mm or less, from the viewpoint of obtaining a joined body having excellent joining property in a short joining process time.

When the size is in such a range, the film can be efficiently spread on the joining surface by sandwiching the film between the base material A and the base material B and applying heat, pressure, or the like, thereby obtaining a high joining force.

The film may be a single layer or a laminated body including a plurality of layers, but is preferably a single layer from the viewpoint of ease of production and improvement of joining force.

In addition, the film may have tackiness to the extent that the joining force and the heat resistance thereof are not impaired.

<<Production Method of Film>>

The method for producing the film is not particularly limited, but for example, a resin composition is obtained by heating and polymerizing a monomer or oligomer of a bifunctional epoxy compound, a solvent is added to the obtained resin composition as necessary, the composition is applied to a release film or the like, cured and dried, and pressurized as necessary to obtain a film.

Second Joining Step

The second joining step is a step of joining the base material A and the resin B by melting and then solidifying the film in a state in which the film joined to the base material A is brought into contact with the resin B.

From the viewpoint of obtaining a high joining force, in the second joining step, it is preferable to heat the film at a temperature equal to or higher than the melting point of at least one of the resin B and the film to melt and then solidify the film. By heating at a temperature equal to or higher than the melting point of at least one of the resin B and the film, the film and the base material are compatibilized, and a stronger joining force is easily obtained.

Examples of the method for melting the film include at least one method selected from the group consisting of contact heating, warm air heating, hot press, infrared heating, hot plate welding, ultrasonic welding, vibration welding, and high-frequency induction welding. Among these, hot press, ultrasonic welding, and high-frequency induction welding are preferable.

The conditions in the case of performing the hot press are not particularly limited.

For example, the temperature is preferably 100° C. to 400° C., more preferably 120° C. to 350° C., and still more preferably 150° C. to 300° C. By heating to 100° C. to 400° C., the film is efficiently deformed and melted and effectively wets and spreads on the joining surface, whereby a high joining force is obtained.

The pressurization force in the hot press is preferably 0.01 to 20 MPa, more preferably 0.1 to 10 MPa, and still more preferably 0.2 to 5 MPa. By pressurizing at 0.01 to 20 MPa, the film is efficiently deformed and effectively wets and spreads on the joining surface, whereby a high joining force is obtained. In a case where the resin B is a thermoplastic resin, by pressurizing at 0.01 to 20 MPa, the film and the base material are made compatible with each other and a strong joining force can be obtained.

The conditions for performing ultrasonic welding are not particularly limited.

For example, the transmission frequency is preferably 10 to 70 kHz, and more preferably 15 to 40 kHz.

The ultrasonic wave application time is preferably 0.1 to 3 seconds, and more preferably 0.2 to 2 seconds, from the viewpoint of adhesiveness and appearance.

When the base material A and the resin B are pressurized during ultrasonic wave application, the pressurization force is preferably 0.01 to 20 MPa, more preferably 0.1 to 10 MPa, and still more preferably 0.2 to 5 MPa. By pressurizing at 0.01 to 20 MPa, the film is efficiently deformed and effectively wets and spreads on the bonding surface, whereby a high bonding force is obtained.

The conditions for performing ultrasonic welding are not particularly limited.

For example, the oscillation frequency is in a range of 1 to 1500 kHz. The oscillation frequency may be adjusted to an appropriate oscillation frequency according to the size and type of the base material A and the resin B.

The output may be in a range of 100 to 5000 W.

The oscillation time may be adjusted according to the size and type of the base material A and the resin B, and is, for example, preferably 1.0 to 10.0 seconds, and more preferably 1.5 to 8.0 seconds.

As described above, the joining of the base material A and the resin B utilizes the phase change (solid to liquid to solid) of the film and does not involve a chemical reaction, so that the joining can be completed in a shorter time than that of the conventional thermosetting epoxy resin.

[Joined Body]

The Figure shows one embodiment of the joined body of the present invention. A joined body 1 shown in the Figure is obtained by integrally joining a base material A 3 and a resin B 4 via a joining layer 2 in which a film made of an amorphous thermoplastic resin which is at least one of a thermoplastic epoxy resin and a phenoxy resin is melted and then solidified. The joined body of the present invention exhibits excellent joining strength even when it is a joined body of different kinds of materials. Since the joining strength is affected by many factors such as the thickness of the joining layer, the molecular weight and chemical structure of the polymer constituting the film, mechanical properties, and viscoelastic properties, in addition to the strength of the interfacial interaction acting between the joining layer and the base material A and between the joining layer and the resin B, the details of the mechanism by which the joined body of the present invention exhibits excellent joining strength are not clear, but it is presumed that the main factors are that the cohesive force in the amorphous thermoplastic resin constituting the joining layer 2 is low, and that hydroxy groups exist in the resin to form chemical bonds and intermolecular forces such as hydrogen bonds and van der Waals forces at the interfaces between the joining layer and the base material A and between the joining layer and the resin B. However, in the above-mentioned joined body, the state or characteristic of the above-mentioned interface of the above-mentioned joined body is a very thin chemical structure at the nanometer level or less, which is difficult to analyze, and it is impossible or impractical in the present technology to express it so as to distinguish it from that not due to the use of a film by specifying it.

The joined body of the present invention in which the joining layer is made of a thermoplastic resin is excellent in recycling property and repairing property, and can be easily disassembled into the base material A and the resin B by heating the joined body.

(Base Material A)

The base material A is at least any one of a metal and an inorganic substance.

The metal is not particularly limited, and examples thereof include aluminum, iron, copper, magnesium, and titanium.

In the present embodiment, the term "iron" is used to include iron and an alloy thereof. Examples of the alloy of iron include steel and stainless steel. Similarly, copper, aluminum, magnesium, and titanium are also used in the meaning of including these simple substances and alloys thereof.

The inorganic substance is not particularly limited, and examples thereof include glass, ceramic, and a carbon molded body.

Examples of the glass include, in addition to general glass, heat-resistant glass, fire resistant glass, fireproof glass, and chemically strengthened glass used for the protection of smartphones. Specific examples include soda-lime glass, lead glass, borosilicate glass, and quartz glass.

Examples of the ceramics include fine ceramics used in semiconductors, automobiles, and industrial equipment. Specific examples include oxide-based ceramics such as alumina, zirconia, and barium titanate; hydroxide-based ceramics such as hydroxyapatite; carbide-based ceramics such as silicon carbide; and nitride-based ceramics such as silicon nitride.

The base material A is preferably made of a metal from the viewpoint of heat resistance and strength.

(Resin B)

The resin B is not particularly limited, but is preferably composed of one selected from the group consisting of a thermoplastic resin, a thermosetting resin, and a fiber reinforced plastic (FRP), and is more preferably composed of a thermoplastic resin from the viewpoint of joining force, cost, and ease of molding.

Examples of the thermoplastic resin include polyolefins and acid-modified products thereof, polystyrene, polymethyl methacrylate, AS resins, ABS resins, thermoplastic aromatic polyesters such as polyethylene terephthalate and polybutylene terephthalate, polycarbonates, polyimides, polyamides, polyamideimides, polyetherimides, polyethersulfones, polyphenylene ethers and modified products thereof, polyphenylene sulfides, polyoxymethylenes, polyarylates, polyether ketones, polyether ether ketones, polyether ketone ketones, thermoplastic epoxies, and fiber reinforcing materials thereof. As the thermosetting resin, for example, one or more selected from epoxy resins, vinyl ester resins, phenol resins, urethane resins, and the like can be used. From the viewpoint of heat resistance, joining force, cost, ease of molding, and the like, it is preferably made of at least one selected from polycarbonate, glass fiber reinforced polyamide, glass fiber reinforced polybutylene terephthalate, and glass fiber reinforced polyphenylene sulfide.

In a case where the resin B has a melting point, the melting point is preferably 100° C. to 400° C., more preferably 150° C. to 350° C., and still more preferably 180° C. to 300° C. When the melting point is in the range of 100° C. to 400° C., the film is efficiently deformed and melted by heating and effectively wets and spreads on the joined surface, so that high joining force can be obtained.

The combination of the base material A and the resin B is not particularly limited.

The shapes of the base material A and the resin B are not particularly limited, but the thickness of each is preferably 0.1 mm or more, more preferably 0.3 mm or more, still more preferably 0.5 mm or more, and particularly preferably 1 mm or more. When the thickness is 0.1 mm or more, a strong joined body can be obtained. In addition, the thickness of each of the base material A and the resin B is preferably 10 mm or less, more preferably 8 mm or less, still more preferably 6 mm or less, and particularly preferably 4 mm or less. When the thickness is 10 mm or less, it is easy to heat efficiently and the production is facilitated.

(Pretreatment)

It is preferable that surfaces of the base material A and the resin B be both subjected to a pretreatment for the purpose of removal of contaminations on the surfaces and/or anchor effect.

Examples of the pretreatment include a degreasing treatment, an UV ozone treatment, a blasting treatment, a polishing treatment, a plasma treatment, a corona discharge treatment, a laser treatment, an etching treatment, and a flame treatment.

A pretreatment for cleaning the surface of the base material or a pretreatment imparting irregularities on the surface is preferable as the pretreatment. Specifically, when the base material includes aluminum, glass, a ceramic, or iron, at least one kind selected from the group consisting of a degreasing treatment, an UV ozone treatment, a blasting treatment, a polishing treatment, a plasma treatment, and an etching treatment is preferable, and when the base material includes an FRP, a polypropylene, a polycarbonate, a polymethyl methacrylate, a polyetherimide, a polyamide, or a polybutylene terephthalate, at least one kind selected from the group consisting of a degreasing treatment, an UV ozone treatment, a blasting treatment, a polishing treatment, a plasma treatment, and a corona discharge treatment is preferable.

One kind of the pretreatment may be carried out alone, or two or more kinds thereof may be carried out. Known methods can be used as specific methods for these pretreatments.

Usually, hydroxy groups derived from a resin or a reinforcing material are considered to be present on the surface of an FRP, and hydroxy groups are considered to be intrinsically present on glass and ceramic surfaces; meanwhile, hydroxy groups are newly generated through the pretreatment, and the amount of hydroxy groups on the surface of the base material can be increased.

The degreasing treatment is a method for dissolving dirt such as fat and oil on the base material surface with, for example, an organic solvent such as acetone and toluene to remove dirt.

The UV ozone treatment is a method for cleaning and modifying a surface by the energy of ultraviolet rays with short wavelengths emitted from a low-pressure mercury lamp and the power of ozone ($O_3$) generated thereby. In a case of glass, the UV ozone treatment is one surface cleaning method for removing organic impurities on a surface. In general, a cleaned surface modifying device using a low-pressure mercury lamp is referred to as an "UV ozone cleaner", an "UV cleaning device", an "ultraviolet surface modifying device", and the like.

Examples of the blasting treatment include a wet blasting treatment, a shot blasting treatment, and a sandblasting treatment. Among these, a wet blasting treatment is preferable because a denser surface can be obtained as compared with a dry blasting treatment.

Examples of the polishing treatment include buffing using a polishing cloth, roll polishing using polishing paper (sandpaper), and electrolytic polishing.

The plasma treatment creates a plasma beam with a high-voltage power supply and a rod and causes the plasma beam to impinge on a material surface to excite molecules and functionalize the molecules, and includes an atmospheric pressure plasma treatment method capable of imparting hydroxy groups or polar groups onto a material surface, for example.

The corona discharge treatment includes a method applied for surface modification of a polymer film and is a method for generating hydroxy groups or polar groups on a surface, beginning at radicals generated by cutting, with electrons emitted from an electrode, polymer main chains or side chains on a polymer surface layer.

The laser treatment is a technique improving surface characteristics by rapidly heating only a surface of a base material with laser irradiation and cooling same, and is an effective method for surface coarsening. Known laser treatment techniques can be used.

Examples of the etching treatment include chemical etching treatments such as an alkali method, a phosphoric acid-sulfuric acid method, a fluoride method, a chromic acid-sulfuric acid method, and a salt iron method, and electrochemical etching treatments such as an electrolytic etching method.

The flame treatment is a method combusting a mixed gas of a combustion gas and air to generate plasma from oxygen in the air and trying to make a surface hydrophilic by imparting the oxygen plasma to an object to be treated. Known flame treatment techniques can be used.

EXAMPLES

Next, specific examples of the present invention will be described, but the present invention is not particularly limited to these Examples.

[Production of Film]

Production Example 1

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, weight average molecular weight: about 10,000), 1.0 equivalent (12.5 g) of bisphenol S, 2.4 g of triphenylphosphine, and 1,000 g of methyl ethyl ketone, and the temperature was increased to 100° C. while stirring in a nitrogen atmosphere. Completion of dissolution was visually confirmed, and the mixture was cooled to 40° C. to obtain a thermoplastic epoxy resin composition having a solid content of about 20% by mass. The solvent was removed from this to obtain a thermoplastic epoxy resin as a solid component. Non-adhesive fluororesin films (NITOFLON (registered trademark) No. 900UL, manufactured by Nitto Denko Corporation) were placed on an upper plate and a lower plate of a pressing machine, the thermoplastic epoxy resin was placed on the non-adhesive fluororesin film of the lower plate, the press machine was heated to 160° C., and the thermoplastic epoxy resin was heated and compressed for 2 hours to obtain a film P-1 having a solid content of 100% by mass, a length of 32 to 33 mm, and a thickness of 100 μm. The measurement results of the weight average molecular weight, the epoxy equivalent, and the heat of fusion of the obtained film P-1 are as shown in Table 1. The weight average molecular weight was measured by dissolving the obtained film in tetrahydrofuran.

In addition, the same measurement was performed on a film and a joining agent obtained by other Production Examples described later, and the results are also shown in Table 1.

Production Example 2

Into a reaction device equipped with a stirrer, a reflux condenser, a gas introduction tube, and a thermometer, 20 g of Phenotohto (registered trademark) YP-50S (manufactured by NIPPON STEEL Chemical & Material Co., Ltd., phenoxy resin, weight average molecular weight: about 50,000) and 80 g of cyclohexanone were charged, the temperature was raised to 60° C. while stirring, completion of dissolution was visually confirmed, and the temperature was cooled to 40° C., thereby obtaining a resin composition having a solid content of 20% by mass. The solvent was removed therefrom to obtain a film P-2 having a solid content of 100% by mass and a thickness of 100 μm.

Production Example 3

The film P-2 and a crystalline epoxy resin YSLV-80XY (manufactured by NIPPON STEEL Chemical & Material Co., Ltd.) were pulverized and mixed at a mass ratio of 98:2, pressed in a vise, and heated to 50° C. to obtain a film P-3 having a solid content of 100% by mass and a thickness of 100 μm.

Production Example 4

The film P-2 and a crystalline epoxy resin YSLV-80XY (manufactured by NIPPON STEEL Chemical & Material Co., Ltd.) were pulverized and mixed at a mass ratio of 94:6, pressed in a vise, and heated to 50° C. to obtain a film P-4 having a solid content of 100% by mass and a thickness of 100 μm.

Production Example 5

The film P-2 and a crystalline epoxy resin YSLV-80XY (manufactured by NIPPON STEEL Chemical & Material Co., Ltd.) were pulverized and mixed at a mass ratio of 89:11, pressed in a vise, and heated to 50° C. to obtain a film P-5 having a solid content of 100% by mass and a thickness of 100 μm.

Comparative Production Example 1

Two liquids of a heat-curable liquid epoxy adhesive E-250 (manufactured by Konishi Co., Ltd., a two liquid type of a bisphenol-type epoxy resin and an amine curing agent) were mixed, applied to a release film, cured at 100° C. for 1 hour, cooled, and peeled off from the release film to obtain a film Q-1 having a thickness of 100 μm.

In the film Q-1, no heat of fusion peak was detected by DSC measurement, and the epoxy equivalent and the weight average molecular weight could not be measured because the film was insoluble in a solvent.

Comparative Production Example 2

An amorphous polycarbonate film (Iupilon (registered trademark) FE2000, manufactured by Mitsubishi Engineering-Plastics Corporation, thickness: 100 μm) was cut to obtain a film Q-2.

In the film Q-2, no heat of fusion peak was detected by DSC measurement, and the epoxy equivalent and the weight average molecular weight could not be measured because the film was insoluble in a solvent.

Comparative Production Example 3

A crystalline epoxy resin YSLV-80XY (manufactured by NIPPON STEEL Chemical & Material Co., Ltd) was pressed at room temperature to obtain a sheet, and then the sheet was cut to obtain a film Q-3 having a thickness of 100 μm.

The measurement results of the weight average molecular weight, the epoxy equivalent, and the heat of fusion of the obtained film Q-3 are as shown in Table 2.

Comparative Production Example 4

A heat-curable liquid epoxy adhesive E-250 (manufactured by Konishi Co., Ltd., a two liquid type of a bisphenol-type epoxy resin and an amine curing agent) was directly used as a liquid joining agent Q-4.

In the joining agent Q-4, no heat of fusion peak was detected by DSC measurement, and the epoxy equivalent and the weight average molecular weight could not be measured because the film was insoluble in a solvent.

Comparative Production Example 5

A flask was charged with 1.0 equivalent (203 g) of jER (registered trademark) 1007 (manufactured by Mitsubishi Chemical Corporation, bisphenol A-type epoxy resin, weight average molecular weight: about 10000), 1 equivalent (12.5 g) of bisphenol S, 2.4 g of triphenylphosphine, and 1,000 g of methyl ethyl ketone, and the mixture was stirred at room temperature to obtain a liquid joining agent Q-5 having a solid content of about 20% by mass.

For the joining agent Q-5, the weight average molecular weight, the epoxy equivalent, the heat of fusion, and the melting point were measured using a thermoplastic epoxy resin polymer formed on the surface of the resin A in Comparative Example 5 described later.

Comparative Production Example 6

Into a reaction device equipped with a stirrer, a reflux condenser, a gas introduction tube, and a thermometer, 20 g of Phenotohto (registered trademark) YP-50S (manufactured by NIPPON STEEL Chemical & Material Co., Ltd., phenoxy resin, weight average molecular weight: about 50,000) and 80 g of cyclohexanone were charged, the temperature was raised to 60° C. while stirring, completion of dissolution was visually confirmed, and the temperature was cooled to 40° C., thereby obtaining a liquid joining agent Q-6 having a solid content of 20% by mass.

For the joining agent Q-6, the weight average molecular weight, the epoxy equivalent, the heat of fusion, and the melting point were measured using a phenoxy resin coating layer formed on the surface of the resin A in Comparative Example 6 described later.

In the joining agent Q-6, no heat of fusion peak was detected by DSC measurement, and the epoxy equivalent was above the detection limit.

Comparative Production Example 7

A crystalline polyamide-based hot-melt adhesive film NT-120 (manufactured by Nihon Matai Co., Ltd., thickness: 100 μm) was cut to obtain a film Q-7 having a thickness of 100 μm.

In the film Q-7, the epoxy equivalent and the weight average molecular weight could not be measured because the film was insoluble in a solvent. The measurement results of the heat of fusion are as shown in Table 3.

Evaluation Method

The weight average molecular weight, the heat of fusion, and the epoxy equivalent of the film and the joining agent were each determined as follows. In addition, the thickness of the film was measured by the following method.

(Weight Average Molecular Weight)

The film and the joining agent were dissolved in tetrahydrofuran and measured under the following conditions using Prominence 501 (manufactured by SHOWA SCIENCE CO., LTD., Detector: Shodex (registered trademark) RI-501 (manufactured by Showa Denko K.K.)).

Column: two columns LF-804 manufactured by Showa Denko K.K.

Column temperature: 40° C.

Sample: 0.4% by mass tetrahydrofuran solution of resin

Flow rate: 1 mL/minute

Eluting solution: tetrahydrofuran

Calibration method: standard polystyrene equivalent (Heat of Fusion and Melting Point)

A film and a joining agent were weighed in an amount of 2 to 10 mg, placed in an aluminum pan, and heated from 23° C. to 200° C. at a rate of 10° C./min by DSC (DSC8231, manufactured by Rigaku Corporation) to obtain a DSC curve. The heat of fusion was calculated from the area of the endothermic peak at the time of melting in the DSC curve and the weighed value. The endothermic peak temperature of the obtained DSC curve was taken as the melting point. In the case where an endothermic peak is not obtained or the heat of fusion is 15 J/g or less, a temperature obtained by adding 70° C. to the glass transition point was taken as the melting point. The glass transition point was defined as a temperature at the start of the drop in a DSC curve in a second cycle in which the temperature is raised to 200° C., then cooled to 40° C. or lower, and then heated to 200° C. in DSC. The melting point was not set for the thermosetting resin that did not melt by heating.

(Epoxy Equivalent)

The epoxy equivalent was measured in accordance with JIS K 7236:2001 and converted into a value as a resin solid content. In the case of a simple mixture that does not involve a reaction, the epoxy equivalent was calculated from each epoxy equivalent and content.

(Thickness of Film)

The thickness of the film was measured using MDC-25MX manufactured by Mitutoyo Corporation after the films were left in an atmosphere with humidity of 50% at 23° C. for 24 hours.

[Production of Joined Body]

Base Material A

The following base materials were used as the base material A.

<<Iron>>

The surface of SPCC-SD was subjected to blasting treatment to obtain a test piece having a width of 18 mm, a length of 45 mm, and a thickness of 1.6 mm.

<<Aluminum>>

The surface of A6061-T6 was subjected to blasting treatment to obtain a test piece having a width of 18 mm, a length of 45 mm, and a thickness of 1.6 mm.

Resin B

The following base materials were used as the resin B.

<<Pa6 (6-Nylon)>>

Amilan CM1011G-30 manufactured by Toray Industries, Inc. was injection molded to obtain a test piece (softening point: 215° C., melting point: 225° C.) having a width of 10 mm, a length of 45 mm, and a thickness of 3 mm. The test piece was used without surface treatment.

In order to heat efficiently in ultrasonic welding, a linear protrusion having a cross section of an equilateral triangle and a height of 0.5 mm was formed at a position 2.5 mm from the end.

<<PBT (Polybutylene Terephthalate)>>

A test piece (softening point: 207° C., melting point: 225° C.) having a width of 18 m, a length of 45 mm, and a thickness of 1.5 mm was obtained by injection-molding 420-1001 manufactured by SABIC. The test piece was used without surface treatment. In order to efficiently perform heating at the time of joining using an ultrasonic welding machine (second joining step), a linear protrusion having a cross section of an equilateral triangle and a height of 0.5 mm was formed at a position 2.5 mm from the end.

<<Pc (Polycarbonate)>>

121R manufactured by SABIC was injection molded to obtain a test piece (softening point: 129° C., melting point: 220° C.) having a width of 10 mm, a length of 45 mm, and a thickness of 3 mm. The test piece was used without surface treatment. In order to efficiently perform heating at the time of joining using an ultrasonic welding machine (second joining step), a linear protrusion having a cross section of an equilateral triangle and a height of 0.5 mm was formed at a position 2.5 mm from the end.

Example 1

The film P-1 cut into a size of 10×15 mm was placed on the aluminum base material as the base material A, and the film P-1 was heated to a temperature of 200° C. to melt the film P-1, and then allowed to cool at ordinary temperature for 1 minute to solidify the film P-1, thereby joining the base material A and the film P-1.

Subsequently, the PC base material as the resin B was brought into contact with the film P-1 joined to the base material A. The base materials were overlapped with each other with a width of 10 mm and a depth of 5 mm. The film P-1 was disposed so as to cover all the overlapped regions of the base materials. That is, the base material A and the resin B were not in direct contact with each other, and the film P-1 was interposed between the base material A and the resin B to prepare a laminated body in which the resin B and the film P-1 were not joined to each other.

By applying ultrasonic waves using an ultrasonic welding machine (manufactured by Seidensha Electronics Co., Ltd., Oscillator JII930S, Press JIIP30S), the base material A and the base material B were joined by heating and pressurization. The amount of sinking was set to 0.6 mm, and the ultrasonic wave application time was set to 1 second or less. The joining was terminated when the sinking was completed, and was terminated even if the time was less than 1 second. The subsequent retention time was 1 second. The pressurization force was 110 N (pressure: 2.2 MPa), and the oscillation frequency was 28.5 kHz. Thus, a joined body was produced.

Further, in the case where the aluminum was used as the base material A and the PA6 was used as the base material B, in the case where the aluminum was used as the base material A and the PBT was used as the base material B, and in the case where the iron was used as the base material A and the PC was used as the base material B, a joined body was obtained by the same operation as described above.

For open time evaluation, a joined body was produced in the same manner as described above except that the film was allowed to stand for 3 days in a state where the film was joined to the base material A, and then the resin B was brought into contact with the film joined to the base material A, and the base material A and the resin B were joined.

Examples 2 to 5 and Comparative Examples 1 to 3

A joined body was produced in the same manner as in Example 1 except that the materials were changed as shown in Tables 1 and 2.

Comparative Example 4

A joining agent Q-4 obtained by mixing two liquids of a heat-curable liquid epoxy adhesive E-250 (manufactured by Konishi Co., Ltd., a two liquid type of a bisphenol-type epoxy resin and an amine curing agent) was applied over an area of 10 mm in length×18 mm in width to each of the surfaces of the aluminum base material as the base material A and the PC base material as the resin B, and was bonded within 1 minute. Thereafter, the joining agent Q-4 was cured by leaving it in an oven at 100° C. for 1 hour in a state of being fixed with a clip. Thereafter, the joining agent was cooled to room temperature. Thus, a joined body was produced. The thickness of the adhesive layer was 0.1 mm.

For open time evaluation, a joined body was produced in the same manner as described above, except that the joining agent Q-4 was applied to each of the base material A and the resin B, allowed to stand for 3 days, and then allowed to stand in an oven at 100° C. for 1 hour in a state in which the base material A and the resin B were superposed and fixed with a clip.

Comparative Example 5

The liquid joining agent Q-5 was bar coated on the aluminum base material as the base material A, dried at room temperature for 30 minutes, and then left to stand in an oven at 160° C. for 2 hours to form a solid thermoplastic epoxy resin polymer coating layer having a length of 20 mm×a width of 18 mm×a thickness of 50 μm on the surface of the base material A.

Subsequently, the base material A and the PC base material as the resin B were superposed on each other, and then a joined body was obtained by ultrasonic welding in the same manner as in Example 1.

For open time evaluation, a joined body was produced in the same manner as described above, except that the base material A having the thermoplastic epoxy resin polymer coating layer formed on the surface thereof was allowed to stand for 3 days, and then the base material A and the resin B were superposed.

Comparative Example 6

The liquid resin composition was bar coated on the aluminum base material as the base material A, and left to stand in an oven at 70° C. for 30 minutes to form a phenoxy resin coating layer having a length of 20 mm×a width of 18 mm×a thickness of 50 μm on the surface of the base material A.

A joined body was produced in the same manner as in Comparative Example 5, except that the coating layer on the base material A and the PC base material as the resin B were superposed.

For open time evaluation, a joined body was produced in the same manner as described above, except that the base material A having the phenoxy resin coating layer formed on the surface thereof was allowed to stand for 3 days, and then the base material A and the resin B were superposed.

Comparative Example 7

A joined body (including a joined body for open time evaluation) was produced in the same manner as in Example 1 except that the film Q-7 was used as the film.

Comparative Examples 8 to 11

A joined body (including a joined body for open time evaluation) was produced in the same manner as in Example 1 except that a laminated body was prepared by laminating the base material A, the film, and the resin B in this order without joining the base material A and the film.

Evaluation Method of Joined Body

The following evaluations were performed on the obtained joined body. The evaluation results are shown in Tables 1 to 3.

(Shear Joining Force)

Each of the joined bodies obtained in Examples and Comparative Examples was allowed to stand at a measurement temperature (23° C. or 80° C.) for 30 minutes or more, and then a tensile shear joining strength test was performed in 23° C. and 80° C. atmospheres using a tensile testing machine (universal testing machine Autograph "AG-X plus" (manufactured by Shimadzu Corporation); load cell 10 kN, tensile speed 10 mm/min) in accordance with ISO19095 to measure the joining strength.

(Joining Process Time)

The joining process time was measured from a start point to an end point, with the contact time between at least one of the base materials constituting the joined body and the joining agent as the start point and the completion time of the production of the joined body as the end point.

(Recycling Property)

The recycling property was determined based on whether or not the joined body could be easily peeled off with a force of 1 N or less after being placed on a hot plate at 200° C. and heated for 1 minute. If the joined body could be peeled off, it was evaluated as good (A), and if not, it was evaluated as poor (B).

(Repairing Property)

For each of the joined bodies produced by the Examples and the Comparative Examples, a joined body was produced again by the same operation as that of each Example and each Comparative Example using the base material A and the resin B of which the joint was released by the tensile shear strength test at 23° C., thereby obtaining a repair-joined body.

The shear joining force of the repair-joined body at 23° C. was measured in the same manner as the above-mentioned test method, and it was evaluated as good (A) if the shear joining force was 80% or more of the first shear joining force, and it was evaluated as poor (B) if the shear joining force was less than 80%.

(Open Time Evaluation)

Using the joined body for open time evaluation, the tensile shear joining strength test was performed at 23° C. When the shear joining force was 80% or more as compared with the test pieces prepared by the methods of the above-described Examples and Comparative Examples, it was evaluated as good (A), and when it was less than 80%, it was evaluated as poor (B). When the open time evaluation is good (A), it means that the open time is long and the convenience is excellent.

TABLE 1

| | | | | Example 1 | | | | Example 2 |
|---|---|---|---|---|---|---|---|---|
| Composition | Base material A | Type | — | Aluminum | Aluminum | Aluminum | Iron | Aluminum |
| | Resin B | Type | — | PC | PA6 | PBT | PC | PC |
| | | Melting point | ° C. | 220 | 225 | 225 | 220 | 220 |
| | Film | No. | | P-1 | P-1 | P-1 | P-1 | P-2 |
| | | Type | — | Thermo-plastic epoxy resin | Thermo-plastic epoxy resin | Thermo-plastic epoxy resin | Thermo-plastic epoxy resin | Phenoxy resin |
| | | Weight average molecular weight | — | 37000 | 37000 | 37000 | 37000 | 50000 |
| | | Heat of fusion | J/g | No melting peak | No melting peak | No melting peak | No melting peak | No melting peak |
| | | Melting point | ° C. | 171 | 171 | 171 | 171 | 164 |
| | | Epoxy equivalent | g/eq. | Above detection limit | Above detection limit | Above detection limit | Above detection limit | Above detection limit |
| Evaluation | Bonding force | 23° C. Shear joining force | MPa | 13 | 18 | 20 | 15 | 11 |
| | | 80° C. Shear joining force | MPa | 7 | 9 | 12 | 7 | 5 |
| | Convenience | Joining process time | — | 2 minutes | 2 minutes | 2 minutes | 2 minutes | 2 minutes |
| | | Recycling property | — | A | A | A | A | A |
| | | Repairing property | — | A | A | A | A | A |
| | | Open time evaluation | — | A | A | A | A | A |

| | | | Example 3 | Example 4 | Example 5 | Example 6 |
|---|---|---|---|---|---|---|
| Composition | Base material A | Type | Aluminum | Aluminum | Aluminum | Aluminum |
| | Resin B | Type | PC | PC | PC | PC |
| | | Melting point | 220 | 220 | 220 | 220 |
| | Film | No. | P-3 | P-4 | P-5 | P-6 |
| | | Type | Thermo-plastic epoxy resin | Thermo-plastic epoxy resin | Thermo-plastic epoxy resin | Thermo-plastic epoxy resin |
| | | Weight average molecular weight | 36000 | 35000 | 33000 | 30000 |
| | | Heat of fusion | 2 | 4 | 11 | No melting peak |
| | | Melting point | 157 | 153 | 135 | 150 |
| | | Epoxy equivalent | 9600 | 2100 | 1745 | Above detection limit |
| Evaluation | Bonding force | 23° C. Shear joining force | 10 | 11 | 12 | 8 |
| | | 80° C. Shear joining force | 5 | 4 | 6 | 5 |
| | Convenience | Joining process time | 2 minutes | 2 minutes | 2 minutes | 2 minutes |
| | | Recycling property | A | A | A | A |
| | | Repairing property | A | A | A | A |
| | | Open time evaluation | A | A | A | A |

TABLE 2

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Composition | Base material A | Type | — | Aluminum | Aluminum | Aluminum | Aluminum | Aluminum | Aluminum |
| | Resin B | Type | — | PC | PC | PC | PC | PC | PC |
| | | Melting point | ° C. | 220 | 220 | 220 | 220 | 220 | 220 |
| | Film | No. | — | Q-1 | Q-2 | Q-3 | Q-4 | Q-5 | Q-6 |
| | | Type | — | Thermo-setting epoxy resin | Polycarbonate | Epoxy resin | Thermo-setting epoxy resin | Thermo-setting epoxy resin | Phenoxy resin |

TABLE 2-continued

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| | | Weight average molecular weight | — | — | — | 340 | — | 40000 | 50000 |
| | | Heat of fusion | J/g | No melting peak | No melting peak | 70 | No melting peak | No melting peak | No melting peak |
| | | Melting point | ° C. | None | 220 | 60 | None | 170 | 164 |
| | | Epoxy equivalent | g/eq. | — | — | 192 | — | Above detection limit | Above detection limit |
| Evaluation | Bonding force | 23° C. Shear joining force | MPa | 0 | 0 | 0 | 3 | 43 | 14 |
| | | 80° C. Shear joining force | MPa | 0 | 0 | 0 | 2 | 21 | 11 |
| | Convenience | Joining process time | min | 2 minutes | 2 minutes | 2 minutes | 70 minutes | 150 minutes | 32 minutes |
| | | Recycling property | — | B | A | A | A | A | A |
| | | Repairing property | — | B | A | A | B | A | A |
| | | Open time evaluation | — | B | A | A | B | A | A |

TABLE 3

| | | | | Comparative Example 7 | Comparative Example 8 | Comparative Example 9 | Comparative Example 10 | Comparative Example 11 |
|---|---|---|---|---|---|---|---|---|
| Composition | Base material A | Type | — | Aluminum | Aluminum | Aluminum | Aluminum | SPCC |
| | Resin B | Type | — | PC | PC | PA6 | PBT | PC |
| | | Melting point | ° C. | 220 | 220 | 225 | 225 | 220 |
| | Film | No. | — | Q-7 | P-1 | P-1 | P-1 | P-1 |
| | | Type | — | Polyamide | Thermo-plastic epoxy resin | Thermo-plastic epoxy resin | Thermo-plastic epoxy resin | Thermo-plastic epoxy resin |
| | | Weight average molecular weight | — | — | 37000 | 37000 | 37000 | 37000 |
| | | Heat of fusion | J/g | 60 | No melting peak | No melting peak | No melting peak | No melting peak |
| | | Melting point | ° C. | 101 | 171 | 171 | 171 | 171 |
| | | Epoxy equivalent | g/eq. | — | Above detection limit | Above detection limit | Above detection limit | Above detection limit |
| Evaluation | Bonding force | 23° C. Shear joining force | MPa | 0 | 0 | 0 | 0 | 0 |
| | | 80° C. Shear joining force | MPa | 0 | 0 | 0 | 0 | 0 |
| | Convenience | Joining process time | min | 2 minutes | 3.0 seconds | 3.0 seconds | 3.0 seconds | 3.0 seconds |
| | | Recycling property | — | A | A | A | A | A |
| | | Repairing property | — | A | A | A | A | A |
| | | Open time evaluation | — | A | A | A | A | A |

INDUSTRIAL APPLICABILITY

The joined body obtained by the production method of the present invention is used, for example, as automobile components, such as a door side panel, an engine hood roof, a tailgate, a steering hanger, an A pillar, a B pillar, a C pillar, a D pillar, a crush box, a power control unit (PCU) housing, an electric compressor component (such as an inner wall, an intake port, an exhaust control valve (ECV) insertion part, and a mount boss), a lithium ion battery (LIB) spacer, a battery case, and an LED head lamp, and as structural members of a smartphone, a notebook personal computer, a tablet personal computer, a smartwatch, a large size liquid crystal display television set (LCD-TV), and an outdoor LED illumination, but are not particularly limited to these exemplified applications.

REFERENCE SIGNS LIST

1: Joined body
2: Joining layer
3: Base material A
4; Resin B

The invention claimed is:

1. A method for producing a joined body obtained by joining a base material A, a film containing an amorphous thermoplastic resin, which is at least one of a thermoplastic epoxy resin and a phenoxy resin, as a main component, and a resin B in this order, the method comprising:

a first joining step of joining the base material A and the film by melting and then solidifying the film in a state in which the film is in contact with the base material A; and a second joining step of joining the base material A and the resin B by melting and then solidifying the film in a state in which the film joined to the base material A is in contact with the resin B, wherein the base material A is at least one of a metal and an inorganic substance, the film is obtained by a method in which a solvent is added to a resin composition, the composition is applied to a release film, cured and dried, and the release film is released to obtain the film, and an epoxy equivalent of the amorphous thermoplastic resin is 1,600 g/eq. or more, or the amorphous thermoplastic resin does not contain an epoxy group, and a heat of fusion of the amorphous thermoplastic resin is 15 J/g or less.

2. The method for producing a joined body according to claim 1, wherein the resin B is made of a thermoplastic resin.

3. The method for producing a joined body according to claim 1, wherein the base material A is made of a metal.

4. The method for producing a joined body according to claim 1, wherein in the first joining step, the film is heated to 100° C. to 300° C. to be melted and then solidified.

5. The method for producing a joined body according to claim 1, wherein in the second joining step, the film is melted and then solidified by at least one selected from the group consisting of contact heating, warm air heating, hot press, infrared heating, hot plate welding, ultrasonic welding, vibration welding, and high-frequency induction welding.

6. The method for producing a joined body according to claim 1, wherein in the second joining step, the film is melted and then solidified by heating at a temperature equal to or higher than a melting point of at least one of the resin B or the film.

7. The method for producing a joined body according to claim 1, wherein in the second joining step, the film is melted and then solidified at a heating temperature of 100° C. to 400° C. under a pressure of 0.01 to 20 MPa.

* * * * *